A. WILLIAMS.
VEHICLE WHEEL.
APPLICATION FILED JAN. 7, 1911.

1,015,864.

Patented Jan. 30, 1912.

WITNESSES

INVENTOR
ALBERT WILLIAMS

UNITED STATES PATENT OFFICE.

ALBERT WILLIAMS, OF ST. LOUIS, MISSOURI.

VEHICLE-WHEEL.

1,015,864. Specification of Letters Patent. Patented Jan. 30, 1912.

Application filed January 7, 1911. Serial No. 601,331.

*To all whom it may concern:*

Be it known that I, ALBERT WILLIAMS, a citizen of the United States, residing at St. Louis, Missouri, have invented a certain new and useful Improvement in Vehicle-Wheels, of which the following is a full, clear, and exact description, such as will enable others skilled in the art to which it appertains to make and use the same, reference being had to the accompanying drawings, forming part of this specification, in which—

Figure 1:
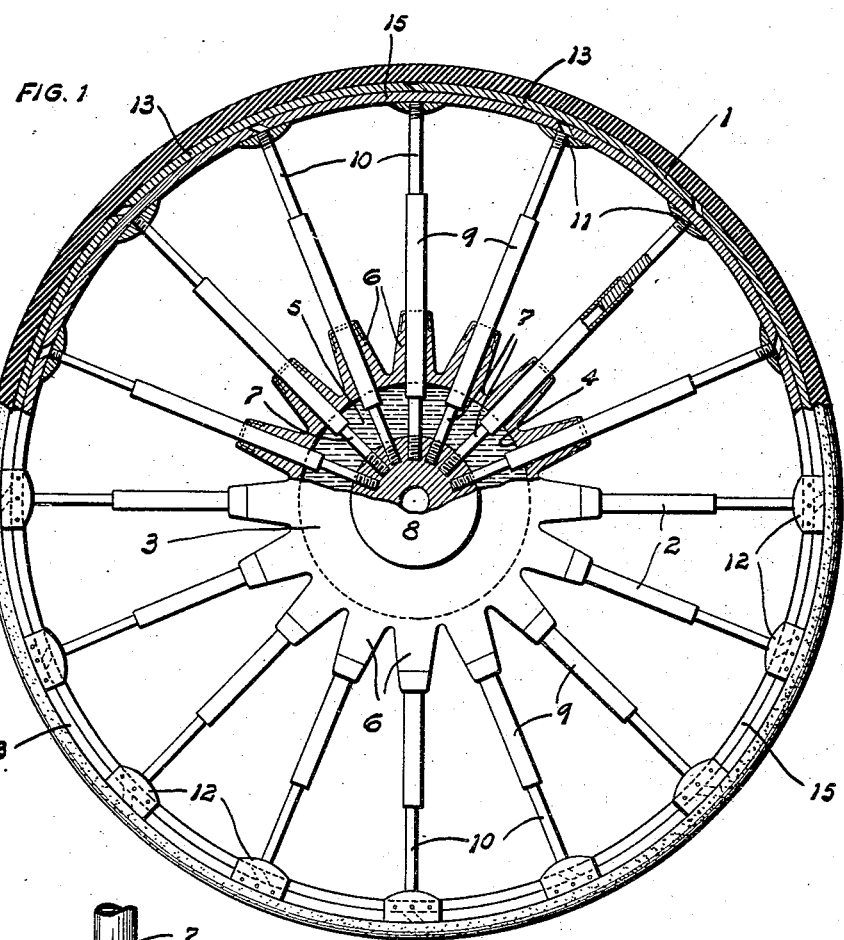
Figure 2:
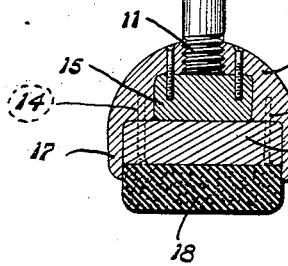
Figure 3:
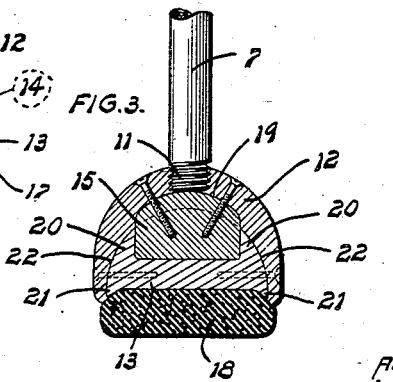

Figure 1 is an elevational view of my improved wheel, partly broken away in order to show certain details of construction; Figs. 2 and 3 show two slightly modified forms of the improved rim of the wheel.

My invention relates to an improvement in wheels, pulleys, and similar devices, and especially in such devices which are arranged to enlarge the periphery thereof.

I have shown my idea in this application as applied to a vehicle wheel of the type which has a solid tire and means provided in the construction of the wheel to allow of a cushioning effect.

In an application filed by me August 22, 1910, Serial No. 578,384, I have described and claimed the novel features of the wheel in so far as it embodies the pneumatic and hydraulic cushioning feature. In the present application, it is my intention to cover simply the improved form of rim structure, which rim may be used with advantage in connection with a wheel of the type described in my former application, but would also be useful in connection with any type of wheel or pulley whether of the pneumatically or hydraulically operated type, or a wheel having a hub with adjustable spokes fastened thereto, and attached directly to the rim.

My improved rim is of use in connection with any rotary devices in which it is the intention to increase or decrease the periphery thereof.

Referring to the drawings, 1 indicates generally the rim of the wheel comprising two sets of segmental sections carrying a solid rubber tire, 2 the spokes, and 3 the hub. The hub is provided with a hollow portion 4, into which is introduced in any suitable manner an incompressible fluid 5.

Projecting outwardly from the hub are suitable projections 6, within which are mounted the telescopic spokes 2. Each spoke is comprised of a section 7 screwed into the solid center of the hub 8, said sections being hollow and adapted to receive compressed air introduced in any suitable manner through the solid portion of the hub. Slidably mounted upon the section 7 and within the projections 6 is a spoke portion 9, which is also hollow and to which is fixedly attached a section 10, either by forming the parts 9 and 10 integral or in any suitable manner attaching the two. Section 10 is screwed at 11 into a head 12, which head is of substantially semi-circular shape in cross section and of sufficient length to overlap and form a proper support for the rim sections.

The rim proper is composed of two series of overlapping sections. The members of the outer set or series of sections 13 are fastened to alternate of the spoke heads 12 by screws 14 which pass vertically through these parts; likewise the inner series 15 of rim sections are fastened to spoke heads alternating with those connected with the outer series 13 by means of screws 16 passing from the outside of the heads 12 vertically or substantially so into the adjacent sections.

As shown in Fig. 1, the members of the series 13, which are connected to alternate of the spoke heads, are of sufficient length to come into proximity to each other within the next adjacent head 12; likewise with the series 15. By this arrangement, each head 12 is attached to one member of either of the series 13 or 15 and overlaps or covers the space formed between adjacent meeting ends of the other series, so that the series 13 and 15 break joints around the wheel.

In the form shown in Fig. 2, the members of the series 13 and 15 are of much the same rectangular shape, those in the series 13 being slightly wider than those of the series 15, but of substantially the same thickness. The head portion 12 extends beyond members of the series 13 to form lips 17 on either side to retain the solid rubber tire 18 extending around the wheel.

In Fig. 3, the inner series 15 is comprised of a series of blocks having two flat sides, and a third side 19, curved, of substantially the same shape as the head 12. The members of the series 13 are provided with a groove to fit upon the corresponding sections 15, and form lips 20 on either side extending about the sections 15. The sections 13 are also formed with a slightly projecting portion 21 to form a seat for the solid tire 18. The outer sides of these sections are curved, as at 22, and adapted to fit within the corresponding curved portions of the heads 12. The screws for attaching the heads 12 to the sections 13 are passed horizontally through these parts, and the screws for attaching the sections 15 to the heads 12 are slightly inclined.

In wheels which are arranged to be expanded by any means from the hub, it is necessary to provide a rim portion which will allow of expansion or retraction to increase or decrease the periphery thereof. In such wheels, my improved type of rim is especially advantageous, but it is to be noted that it may be used in connection with the ordinary form of wheel wherein the spokes are fixedly attached to the hub.

I am aware that minor changes can be made in the construction and arrangement of the various parts of my device without departing from the spirit of my invention.

What I claim is:

In a vehicle wheel, the combination with a hub of a series of spokes carried by said hub, a head seated on the outer end of each spoke, which head is substantially U-shape in cross section, a sectional rim comprising an inner and outer set of segmental sections, the sections of the inner set being rigidly fixed to alternate heads, and the ends of said inner set of sections being loosely seated in alternate heads, the outer set of which sections overlie and break joints with the inner set of sections and which outer set of sections are fixed to alternate heads with their ends loosely mounted in alternate heads and a solid rubber tire applied to the outer set of segmental sections.

In testimony whereof I hereunto affix my signature in the presence of two witnesses, this 29th day of December, 1910.

ALBERT WILLIAMS.

Witnesses:
J. W. CLIFT,
M. P. SMITH.

Copies of this patent may be obtained for five cents each, by addressing the "Commissioner of Patents, Washington, D. C."